United States Patent [19]

Summers et al.

[11] Patent Number: 4,901,797

[45] Date of Patent: Feb. 20, 1990

[54] METHOD FOR PLUGGING SUBTERRANEAN FORMATIONS WITH SILICEOUS GELS

[75] Inventors: Laine E. Summers, Katy, Tex.; Joe D. Allison, Ponca City, Okla.

[73] Assignee: Conoco Inc., Ponca City, Okla.

[21] Appl. No.: 372,396

[22] Filed: Jun. 26, 1989

[51] Int. Cl.$^4$ ............................................. E21B 33/138
[52] U.S. Cl. ...................................... 166/292; 166/300
[58] Field of Search ...................... 166/270, 292, 300; 405/263

[56] References Cited

U.S. PATENT DOCUMENTS

| | | | |
|---|---|---|---|
| 2,693,857 | 11/1954 | Marshall | 166/292 |
| 3,375,872 | 4/1968 | McLaughlin et al. | 166/292 |
| 3,464,494 | 9/1969 | McLaughlin | 166/292 |
| 3,500,928 | 3/1970 | Rockwell | 166/292 |
| 4,203,492 | 5/1980 | Watanabe | 166/300 |
| 4,732,213 | 3/1988 | Bennett et al. | 166/292 |

*Primary Examiner*—George A. Suchfield

[57] ABSTRACT

A high pH solution containing a silica material and an inorganic fluoride salt which hydrolyzes to form hydrofluoric acid are introduced into a subterranean zone where the pH is reduced by the acid whereby the silica material forms a gel and plugs the subterranean zone. The pH at which gelling occurs can be increased by adding a soluble inorganic salt to the solution.

7 Claims, No Drawings

METHOD FOR PLUGGING SUBTERRANEAN FORMATIONS WITH SILICEOUS GELS

BACKGROUND OF THE INVENTION

1. Field of the Invention

Recovery of oil from subterranean formations frequently involves displacing crude oil with a driving fluid, e.g., gas, water, brine, steam, polymer solution, foam, or miscellar solution. Ideally, such techniques (commonly called flooding techniques) would provide a bank of oil of substantial depth being driven to a producing well; in practice, that frequently is not the case. Oil-bearing strata are usually heterogeneous, some parts of them being more permeable to a driving fluid than other. As a consequence, channeling frequently occurs so that the driving fluid flows preferentially through zones depleted of oil (so-called "thief" zones) rather than through those parts of the strata which contain sufficient oil to make oil-recovery operations profitable. High permeability zones can also cause undesirable loss of drilling fluids when a well (e.g., water, oil or waste disposal) is being drilled. Misplaced casing perforations or casing leaks are another cause of channeling of the driving fluid through zones of high permeability in the subterranean formations.

A variety of fluid diversion techniques have been proposed in the prior art. Typically, a gel is formed in situ in zones of very high permeability, thus plugging them and causing fluid to flow through zones which originally were of lower permeability than those which have been plugged.

Polymers and other materials may be converted to gels in situ by appropriately adjusting the pH of solutions containing these materials. Typically, the materials used to effect pH change are organic esters, e.g. ethyl acetate. Such esters hydrolyze to form weak acids which can reduce solution pH. The rate of hydrolysis is a function of temperature, and numerous esters varying in reactivity can be used. Unfortunately, many of these esters cannot be used at higher temperatures above about 80° F. In addition, since they form weak acids they are limited in the pH adjustment which they can achieve.

2. The Prior Art

U.S. Pat. No. 3,464,494 issued to McLaughlin relates to a method of plugging a formation with a solution of acid and sodium silicate having a pH of 1.5 or less to which fluoride is added; wherein the gelling time of the solution is controlled by varying the concentration of fluoride ion in the solution. The sodium silicate gelling time is controlled with fluoride ion obtained from any convenient source.

U.S. Pat. No. 4,203,492 issued to Watanabe discloses a method for acidizing siliceous materials contained in a high temperature formation wherein the injected aqueous fluoride salt solution forms hydrofluoric acid solution in situ when reacted with acid precursor. The fluoride salt must be capable of dissociating in situ to produce fluoride ions for generation of hydrofluoric acid. The fluoride salts disclosed include alkali metal salts of fluoroboric acid.

U.S. Pat. No. 4,732,213 issued to Bennett et al. discloses plugging of subterranean formations with gelled colloidal silica. Latent gelling agents are used to effect gelling, including materials which hydrolyze to release an acid or consume a base, e.g. hydrolyzable esters, acid anhydrides, sulfonates, organic halides or salts of a strong acid and a weak base.

SUMMARY OF THE INVENTION

According to this invention, plugging of a permeable zone in a subterranean formation is effected by introducing into the zone a high pH aqueous solution containing colloidal silica or an alkali metal silicate and an inorganic fluoride compound which hydrolyzes to form hydrofluoric acid, whereby the pH of the aqueous solution is lowered sufficiently to effect gelling in situ of the colloidal silica or alkali metal silicate. An inorganic salt may be added to the solution to increase the pH at which gelling occurs.

DETAILED DESCRIPTION OF THE INVENTION

In carrying out the process of the invention, a siliceous material such as colloidal silica in aqueous solution is combined with an inorganic fluoride salt which is capable of hydrolyzing to form hydrofluoric acid. Colloidal silica is stable at high temperatures and ambient pH (10–12) for many months. When combined with hydrogen fluoride, however, the pH of the colloidal aqueous solution is lowered toward a neutral value (7.0) where gelation of the silica occurs rapidly.

It is possible to control gelling, that is, reduce the rate at which gelling takes place, by varying the amount of inorganic salt which is combined with the colloidal silica solution. Thus, the materials may be admixed at the surface and delivered to the subterranean formation which is to be plugged before gelation takes place. Gelling times from less than one hour to as much as 10 or 24 hours or even several days may be obtained by varying the fluoride salt used and the concentration of such salt in the aqueous solution. These results can be obtained at either low or high temperatures, however, higher temperatures tend to accelerate the rate of gelling.

While colloidal silica is preferred as the gelling material, other materials such as alkali metal silicates including, for example, sodium silicate and potassium silicate may also be used. Sodium silicate is a complicated system of various molecular weight silica polymers in an alkaline solution. Aside from requiring a certain minimum amount of alkalinity, sodium silicate has no definite chemical combining numbers. Any colloidal silica or alkali metal silicate may be used in carrying out the process of the invention. Colloidal silica solutions are described in detail in U.S. Pat. No. 4,732,213. A particularly useful colloidal silica solution is Ludox® SM which is manufactured by Du Pont.

The fluoride salts suitable for use in the process of the invention are aqueous solutions of water-soluble alkali metal and/or ammonium fluoride salts. The fluoride salt must be capable of dissociating in situ to provide fluoride ions for the in situ generation of hydrofluoric acid. Suitable fluoride salts include but are not limited to the water-soluble alkali metal and/or ammonium salts of hydrofluoric acid, fluoroboric acid, hexafluorophosphoric acid, difluorophosphoric acid and fluorosulfonic acid. Specific fluoride salts include but are not limited to such compounds as ammonium fluoride, sodium bifluoride, ammonium fluoroborate, potassium hexafluorophosphate, ammonium difluorophosphate, sodium fluorosulfonate, cesium fluoride, cesium bifluoride, cesium fluorosulfonate. A preferred material is sodium tetrafluoroborate ($NaBF_4$). Fluorine containing silicates such as sodium hexafluorosilicate ($NaSiF_6$) may also be used.

As pointed out previously, organic esters such as ethyl acetate have found use as additives to promote gelling of polymers in oil-field applications. One of the disadvantages of these materials is that they cannot be used at elevated temperatures. The fluoride salts do not have this disadvantage and can provide effective controlled gelation at temperatures from as high as 180° F. up to 250° F. or higher. This is due in great part to the activity and strength of the hydrofluoric acid which is released in the solution at the subterranean location where gelling is desired.

The amount of colloidal silica or alkali metal silicate which is placed in the solution may be varied as desired. Usually this material will be present in a concentration of between about 1 and about 30 wt % and preferably between about 5 and about 15 wt %. The colloidal silica solutions and the alkali metal silicate solutions used all have pH's in the range of about 10 to about 12. As used herein, the term high pH is intended to include a pH range of from about 9 to about 12 or higher.

The concentration of the fluroide salt in the aqueous solution may vary widely depending upon the desired hydrofluoric acid concentration in the acid solution produced in situ and whether the injected fluids will be diluted with connate water and/or water otherwise injected into the formation. Where no dilution of the fluoride salt solution is expected, the fluoride salt concentration is preferably sufficient to provide a fluoride ion concentration between about 0.1 and about 2.0 wt %, more preferably between about 0.50 and about 1.0 wt %. Conversely where substantial dilution of the injected solution is expected a proportionately higher concentration is needed in the injected solution to yield the desired fluoride ion concentration in the acid solution produced in situ.

Many of the fluoride salts are expensive. Thus, it may be desirable to reduce the amount of fluoride salt required in a particular operation. This advantageous result can be attained by adding to the gelling solution a third component, namely a water-soluble salt such as an alkali metal or ammonium halide, nitrate or sulfate. When one or more of these salts is added to the gelling solution, gelling takes place at a higher pH than would occur solely by the addition of the fluoride salt. Specific inorganic salts which may be used include, but are not limited to such materials as sodium chloride, potassium nitrate, sodium sulfate, cesium chloride, ammonium nitrate, sodium nitrate potassium chloride and the like. The amount of inorganic salt which is added to the solution usually will be between about 0.05 and about 1.0 wt % and more usually between about 0.10 and about 0.50 wt %. It is also possible to add to the gelling solution a strong or weak acid to partically neutralize the $SiO_2$ and thus reduce the acid required from the $NaBF_4$. Suitable acids include hydrochloric acid, nitric acid, sulfuric acid and the like.

The order of combining the components of the aqueous gelling mixture is not critical. For example, the fluoride salt and inorganic salt, when used, may be added to the colloidal silicate or alkali metal silicate. Alternatively, the fluoride salt and inorganic salt may first be placed in aqueous solution and then combined with the solution of siliceous material, with the order of combination being optional. The order of adding the acid to the gelling solution, if so added, is also optional.

The aqueous gelling mixture may be delivered to the permeable zone wherein gelation is desired by any conventional means, e.g., by pumping, pressuring, etc. Where highly selective plugging is desired and the amount of gelling material required is small, the gelling mixture may be delivered by a bailer or a coiled tubing.

The amount of gelling solution used in a treatment will vary depending on the type of zone to be plugged and the extend of such zone. For some treatments, the gelling solution required will be only a few liters whereas in others the amount of gelling solution needed will be in the order of 500 up to as high as 750,00 liters or higher.

The following examples illustrate the results obtained in carrying out the invention.

EXAMPLE 1

The pH of a 5 wt % colloidal silica solution containing 0.25 weight percent $NaBF_4$ was determined over a temperature range of 32° C. to 82° C. The results are presented in Table 1.

TABLE 1

| Time | pH of Colloidal Silica Solution | | | |
|---|---|---|---|---|
| (hr) | 32° C. | 49° C. | 60° C. | 82° C. |
| 0.0 | 10.0 | 10.0 | 10.0 | 10.0 |
| 6.0 | 10.0 | 10.0 | 10.0 | 9.5 |
| 24.0 | 10.0 | 10.0 | 9.1 | GEL[1] |
| 48.0 | 10.0 | 9.0 | 8.0 | |
| 144.0 | 9.0 | 6.7 | GEL | |
| 192.0 | 9.0 | GEL | | |
| 240.0 | 9.0 | | | |

[1]The solution pH could not be accurately measured because gelation had occured. However, for gel to form the pH had to be in the pH range from 5.0 to 7.0.

As can be seen from the Table, sodium tetrafluoroborate effectively lowers the solution pH over the entire temperature range.

EXAMPLE 2

Gel times of 10 wt % colloidal silica solutions containing $NaBF_4$ and $NaBF_4$ plus NaCl were obtained over a temperature range of 82° C. to 121° C. The results are shown in Table 2.

TABLE 2

| | | Gel Times of Colloidal Solution (hours) | | | | |
|---|---|---|---|---|---|---|
| | | 82° C. | 99° C. | | 121° C. | |
| wt % $NaBF_4$ | $^nNaBF_4$[1] | No NaCl | No NaCl | 0.165% NaCl | No NaCl | 0.165% NaCl |
| .16 | 0.7 | — | — | 23.5 | — | 5.0 |
| .23 | 1.0 | 26.0 | — | 10.5 | 3.5 | 2.0 |
| .25 | 1.1 | — | 10.5 | 8.0 | 2.5 | 1.5 |
| .34 | 1.5 | — | 5.5 | 4.0 | 1.5 | 1.0 |
| .40 | 1.75 | — | 4.0 | 3.0 | 1.0 | .7 |

[1]The effective neutralization molality, $^nNaBF_4$, is defined as the stoichiometric quantity of $NaBF_4$ that when completely hydrolyzed will produce enough acid to neutralize the silica solution. For example, .23 wt % $NaBF_4$ will react to form enough acid to completely neutralize a 10 wt % solution of Ludox ® SM colloidal silica.

As illustrated in the Table gel time can be varied by changing the concentration of NaBF$_4$. The addition of NaCl to the solutions causes gelation to occur at a higher pH.

EXAMPLE 3

Two test were conducted in Berea cores. A solution of 10 wt % silica, 0.15 wt % NaCl, and 0.23 wt % NaBF$_4$ was injected into a water saturated Berea core maintained at a temperature of 99° C. The second test was conducted using the same solution with residual oil saturation in the core. The pH of the solution in the core could not be monitored. However, if the silica solution gelled, the permeability of the core would be dramatically reduced. Tests indicated that the silica solution injected into the core had a gel time of about 12 hours. A comparison of the core permeability before the silica injection and after a three day shut-in with the silica solution in the core was used to verify that gelation occurred. The permeability of water saturated core was reduced from 460 millidarcies to 0.02 millidarcies. The permeability of the core at residual oil saturation was reduced from 33 millidarcies to 0.01 millidarcies. The results of the core tests confirmed that the pH of the silica solution in reservoir rock was reduced by the hydrolysis of NaBF$_4$ and that gelling of the silica solution resulted.

While certain embodiments and details have been shown for the purpose of illustrating the present invention, it will be apparent to those skilled in the art that various changes and modifications may be made herein without departing from the spirit or scope of the invention.

We claim:

1. A process for selectively plugging a permeable zone in a subterranean formation which comprises injecting into said zone a high pH aqueous solution of colloidal silica or alkali metal silicate and an inorganic fluoride salt which hydrolyzes to form hydrofluoric acid, said inorganic fluoride salt being present in sufficient concentration to reduce the pH of the aqueous solution and effect gelling of the colloidal silica or alkali metal silicate in situ.

2. The process of claim 1 in which the aqueous solution contains colloidal silica and sodium tetrafluoroborate.

3. The process of claim 2 in which the aqueous solution contains a water-soluble inorganic salt.

4. The process of claim 2 in which the aqueous solution contains an acid in an amount sufficient to reduce the required amount of sodium tetrafluoroborate.

5. A process for selectively plugging a permeable zone in a subterranean formation having a temperature above about 82° C. which comprises injecting into said zone a high pH aqueous solution of colloidal silica or alkali metal silicate, a water-soluble inorganic salt, and an inorganic fluoride salt which hydrolyzes to form hydrofluoric acid and an inorganic salt, said inorganic fluoride salt being present in sufficient concentration to reduce the pH of the aqueous solution and effect gelling of the colloidal silica or alkali metal silicate in situ.

6. The process of claim 5 in which the concentration of colloidal silica or alkali metal silicate is between about 1.0 and about 30 wt. %, the concentration of the inorganic fluoride salt is between about 0.1 and about 2.0 wt % and the concentration of the water-soluble inorganic salt is between about 0.05 and about 1.0 wt %.

7. The process of claim 6 in which the aqueous solution contains colloidal silica, sodium tetrafluoroborate and sodium chloride.

* * * * *